(12) United States Patent
Schulz et al.

(10) Patent No.: US 10,029,725 B2
(45) Date of Patent: Jul. 24, 2018

(54) TORQUE FEEDBACK SYSTEM FOR A STEER-BY-WIRE VEHICLE, VEHICLE HAVING STEERING COLUMN, AND METHOD OF PROVIDING FEEDBACK IN VEHICLE

(71) Applicant: STEERING SOLUTIONS IP HOLDING CORPORATION, Saginaw, MI (US)

(72) Inventors: John F. Schulz, Hemlock, MI (US); Joen C. Bodtker, Gaines, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/221,210

(22) Filed: Jul. 27, 2016

(65) Prior Publication Data

US 2017/0158222 A1 Jun. 8, 2017

Related U.S. Application Data

(60) Provisional application No. 62/262,421, filed on Dec. 3, 2015.

(51) Int. Cl.
*B62D 5/00* (2006.01)
*B62D 1/04* (2006.01)
*B62D 1/20* (2006.01)

(52) U.S. Cl.
CPC ............. *B62D 5/006* (2013.01); *B62D 1/04* (2013.01); *B62D 1/20* (2013.01)

(58) Field of Classification Search
CPC ................................ B62D 5/005; B62D 5/006
See application file for complete search history.

(56) References Cited

U.S. PATENT DOCUMENTS

| 4,315,117 A | 2/1982 | Kokubo et al. |
| 4,337,967 A | 7/1982 | Yoshida et al. |

(Continued)

FOREIGN PATENT DOCUMENTS

| CN | 1722030 A | 1/2006 |
| CN | 1736786 A | 2/2006 |

(Continued)

OTHER PUBLICATIONS

EP Application No. 14156903.8 Extended European Search Report, dated Jan. 27, 2015, 10 pages.

(Continued)

*Primary Examiner* — Kevin Hurley
(74) *Attorney, Agent, or Firm* — Cantor Colburn LLP

(57) ABSTRACT

A torque feedback system for a vehicle includes a steering shaft having a longitudinal axis, a jacket surrounding the shaft, the shaft rotatable with respect to the jacket, and at least one mechanical energy storing element arranged to provide torque feedback when the steering shaft is rotated. The at least one mechanical energy storing element includes a first mechanical energy storing element having a first end engageable with the jacket and a second end engageable with the shaft, and a second mechanical energy storing element having a first end engageable with the jacket and a second end engageable with the shaft. The first mechanical energy storing element provides resistance to rotation of the shaft in a first rotational direction, and the second mechanical energy storing element provides resistance to rotation of the shaft in a second rotational direction.

20 Claims, 10 Drawing Sheets

(56) References Cited

U.S. PATENT DOCUMENTS

| | | |
|---|---|---|
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,240,284 A | 8/1993 | Takada et al. |
| 5,295,712 A | 3/1994 | Omura |
| 5,319,803 A | 6/1994 | Allen |
| 5,488,555 A | 1/1996 | Asgari |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,070,686 A | 6/2000 | Pollmann |
| 6,138,788 A | 10/2000 | Bohner et al. |
| 6,170,862 B1 | 1/2001 | Hoagland et al. |
| 6,212,453 B1 | 4/2001 | Kawagoe et al. |
| 6,227,571 B1 | 5/2001 | Sheng et al. |
| 6,256,561 B1 | 7/2001 | Asanuma |
| 6,301,534 B1 | 10/2001 | McDermott, Jr. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,481,526 B1 | 11/2002 | Millsap et al. |
| 6,575,263 B2 * | 6/2003 | Hjelsand ............. B62D 5/003 180/402 |
| 6,578,449 B1 | 6/2003 | Anspaugh et al. |
| 6,598,695 B1 | 7/2003 | Menjak et al. |
| 6,612,392 B2 * | 9/2003 | Park ................. B62D 5/005 180/402 |
| 6,612,393 B2 | 9/2003 | Bohner et al. |
| 6,778,890 B2 | 8/2004 | Shimakage et al. |
| 6,799,654 B2 | 10/2004 | Menjak et al. |
| 6,817,437 B2 | 11/2004 | Magnus et al. |
| 6,819,990 B2 | 11/2004 | Ichinose |
| 6,820,713 B2 | 11/2004 | Menjak et al. |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,150,581 B2 | 4/2012 | Iwazaki et al. |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,452,492 B2 | 5/2013 | Buerkle et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,632,096 B1 | 1/2014 | Quinn et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,725,230 B2 | 5/2014 | Lisseman et al. |
| 8,818,608 B2 | 8/2014 | Cullinane et al. |
| 8,825,258 B2 | 9/2014 | Cullinane et al. |
| 8,825,261 B2 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 * | 3/2015 | Gazit ................. B62D 1/28 340/425.5 |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,159,221 B1 | 10/2015 | Stantchev |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 9,725,098 B2 | 8/2017 | Abou-Nasr et al. |
| 9,810,727 B2 | 11/2017 | Kandler et al. |
| 9,852,752 B1 | 12/2017 | Chou et al. |
| 9,868,449 B1 | 1/2018 | Holz et al. |
| 2003/0046012 A1 | 3/2003 | Yamaguchi |
| 2003/0094330 A1 | 5/2003 | Boloorchi et al. |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0155809 A1 | 7/2005 | Krzesicki et al. |
| 2005/0197746 A1 | 9/2005 | Pelchen et al. |
| 2005/0275205 A1 | 12/2005 | Ahnafield |
| 2006/0224287 A1 | 10/2006 | Izawa et al. |
| 2006/0244251 A1 | 11/2006 | Muller |
| 2006/0271348 A1 | 11/2006 | Rossow et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2009/0024278 A1 | 1/2009 | Kondo et al. |

(56) References Cited

U.S. PATENT DOCUMENTS

| | | |
|---|---|---|
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0150388 A1 | 6/2012 | Boissonnier et al. |
| 2012/0197496 A1 | 8/2012 | Limpibunterng et al. |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0253765 A1 | 9/2013 | Bolourchi et al. |
| 2013/0292955 A1 | 11/2013 | Higgins et al. |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0152551 A1 | 6/2014 | Mueller et al. |
| 2014/0156107 A1 | 6/2014 | Karasawa et al. |
| 2014/0168061 A1 | 6/2014 | Kim |
| 2014/0172231 A1 | 6/2014 | Terada et al. |
| 2014/0277896 A1 | 9/2014 | Lathrop et al. |
| 2014/0277945 A1 | 9/2014 | Chandy |
| 2014/0300479 A1 | 10/2014 | Wolter et al. |
| 2014/0309816 A1 | 10/2014 | Stefan et al. |
| 2014/0354568 A1 | 12/2014 | Andrews et al. |
| 2015/0002404 A1 | 1/2015 | Hooton |
| 2015/0006033 A1 | 1/2015 | Sekiya |
| 2015/0014086 A1 | 1/2015 | Eisenbarth |
| 2015/0032322 A1 | 1/2015 | Wimmer |
| 2015/0032334 A1 | 1/2015 | Jang |
| 2015/0051780 A1 | 2/2015 | Hahne |
| 2015/0060185 A1 | 3/2015 | Feguri |
| 2015/0120141 A1 | 4/2015 | Lavoie et al. |
| 2015/0120142 A1 | 4/2015 | Park et al. |
| 2015/0123947 A1 | 5/2015 | Jubner et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2015/0338849 A1 | 11/2015 | Nemec et al. |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0291862 A1 | 10/2016 | Yaron et al. |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0355207 A1* | 12/2016 | Urushibata .............. B62D 1/16 |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0364003 A1 | 12/2016 | O'Brien |
| 2016/0368522 A1 | 12/2016 | Lubischer et al. |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0113712 A1 | 4/2017 | Vvatz |
| 2017/0151978 A1* | 6/2017 | Oya ................... B62D 5/0487 |
| 2017/0158055 A1 | 6/2017 | Kim et al. |
| 2017/0225704 A1* | 8/2017 | Urushibata ............ B62D 5/001 |
| 2017/0240204 A1 | 8/2017 | Raad et al. |
| 2017/0293306 A1 | 10/2017 | Riefe et al. |
| 2017/0297606 A1 | 10/2017 | Kim et al. |
| 2017/0305458 A1 | 10/2017 | Wang et al. |
| 2018/0029632 A1 | 2/2018 | Bodtker et al. |
| 2018/0072341 A1 | 3/2018 | Schulz et al. |
| 2018/0093700 A1 | 4/2018 | Chandy |
| 2018/0105198 A1 | 4/2018 | Bodtker et al. |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102320324 A * | 1/2012 |
| CN | 102452391 A | 5/2012 |
| CN | 202563346 U | 11/2012 |
| CN | 103158699 A | 6/2013 |
| CN | 103419840 A2 | 12/2013 |
| CN | 103448785 A | 12/2013 |
| CN | 103677253 A | 3/2014 |
| CN | 104024084 A | 9/2014 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102008057313 A1 | 10/2009 |
| DE | 102010025197 A1 | 12/2011 |
| DE | 102012010887 A1 | 12/2013 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S60157963 A | 8/1985 |
| JP | S60164629 A | 8/1985 |
| JP | H05162652 A | 6/1993 |
| JP | 2007253809 A | 10/2007 |
| JP | 2017004099 A * | 1/2017 ............... B62D 1/16 |
| KR | 20100063433 A | 6/2010 |
| WO | 2006099483 A1 | 9/2006 |
| WO | 2007034567 A1 | 3/2007 |
| WO | 2010082394 A1 | 7/2010 |
| WO | 2010116518 A1 | 10/2010 |
| WO | 2013080774 A1 | 6/2013 |
| WO | 2013101058 A1 | 7/2013 |

OTHER PUBLICATIONS

EP Application No. 14156903.8 Partial European Search Report dated Sep. 23, 2014, 6 pages.

(56) References Cited

OTHER PUBLICATIONS

EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated: Jun. 6, 2013; 7 pages.
European Search Report for related European Application No. 15152834.6, dated: Oct. 8, 2015; 7 pages.
Gillespie, Thomas D.; "Fundamentals of Vehicle Dynamics"; Society of Automotive Engineers, Inc.; published 1992; 294 pages.
Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.
Partial European Search Report for related European Patent Application No. 14156903.8, dated: Sep. 23, 2014, 6 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
English Translation of Chinese Office Action and Search Report for Chinese Application No. 201610832736.4 dated Mar. 22, 2018, 6 pages.
CN Patent Application No. 201610575225.9 First Office Action dated Jan. 22, 2018, 10 pages.
English Translation of Chinese Office Action and Search Report for Chinese Application No. 2016103666609.X dated Dec. 20, 2017, 8 pages.

\* cited by examiner

TORQUE FEEDBACK SYSTEM FOR A STEER-BY-WIRE VEHICLE, VEHICLE HAVING STEERING COLUMN, AND METHOD OF PROVIDING FEEDBACK IN VEHICLE

CROSS-REFERENCES TO RELATED APPLICATIONS

This patent application claims priority to U.S. Provisional Patent Application Ser. No. 62/262,421, filed Dec. 3, 2015 which is incorporated herein by reference in its entirety.

BACKGROUND

The following description relates to a steer-by-wire system, and, more specifically, to a system to provide torque feedback in a steer-by-wire system.

In steer-by-wire systems, mechanical devices with linkages and mechanical connections are replaced with sensors, actuators, and electronics. For example, in a conventional steering system, which includes a steering wheel, a steering column, a power assisted rack and pinion system, and tie rods, the driver turns the steering wheel which, through the various mechanical components, causes the road wheels of the vehicle to turn. In the steer-by-wire system, a number of the mechanical components between the steering wheel and the road wheels of the vehicle are replaced with a sensor at the steering wheel and both sensors and actuators at the road wheels, and the rotation of the steering wheel is measured by the sensor. This rotation measurement is processed by the electronics to generate command signals for the actuators to turn the road wheels. Driver feedback in the form of steering torque that is designed to represent the feel of the road is provided by torque and rotation servo-actuators with software that provide simulation of driving conditions for the driver.

Some passenger vehicles are equipped with an advanced driver assistance system ("ADAS"). Such vehicles are configured to perform operations without continuous input from a driver, such as steering, accelerating, and braking. When the ADAS system is active, the steering wheel is not required for vehicle control. However, the driver may switch between the autonomous and non-autonomous driving conditions, and in the non-active state of the ADAS system, the steering wheel is again required for use by the driver.

Accordingly, it is desirable to provide alternative driver feedback systems for steer-by-wire systems regardless of autonomous capability.

SUMMARY

According to one aspect of the disclosure, a torque feedback system for a vehicle includes a steering shaft having a longitudinal axis, a jacket surrounding the shaft, the shaft rotatable with respect to the jacket, and at least one mechanical energy storing element arranged to provide torque feedback when the steering shaft is rotated. The at least one mechanical energy storing element includes a first mechanical energy storing element having a first end engageable with the jacket and a second end engageable with the shaft, and a second mechanical energy storing element having a first end engageable with the jacket and a second end engageable with the shaft. The first mechanical energy storing element provides resistance to rotation of the shaft in a first rotational direction, and the second mechanical energy storing element provides resistance to rotation of the shaft in a second rotational direction.

According to another aspect of the disclosure, a vehicle includes a steering wheel and a steering column. The steering column includes a steering shaft having a longitudinal axis, the steering shaft connected to the steering wheel for rotation of the steering shaft, a jacket surrounding the shaft, the shaft rotatable with respect to the jacket, and at least one first spring having a first end engageable with the jacket and a second end connected to the shaft, the at least one first spring wound in a first direction around the shaft.

According to yet another aspect of the disclosure, a method of providing torque feedback to a driver of a vehicle includes providing a steering shaft in a non-rotated condition, a first end of a first torsion spring engaged with a contact portion of a steering column jacket, a second end of the first torsion spring attached to the steering shaft, a first end of a second torsion spring engaged with the contact portion of the steering column jacket, a second end of the second torsion spring attached to the steering shaft; rotating the steering shaft in a first direction; increasing a force applied by the first end of the first torsion spring on the contact portion while rotating the steering shaft in the first direction; rotating the steering shaft in a second direction opposite the first direction; and, increasing a force applied by the first end of the second torsion spring on the contact portion while rotating the steering shaft in the second direction.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
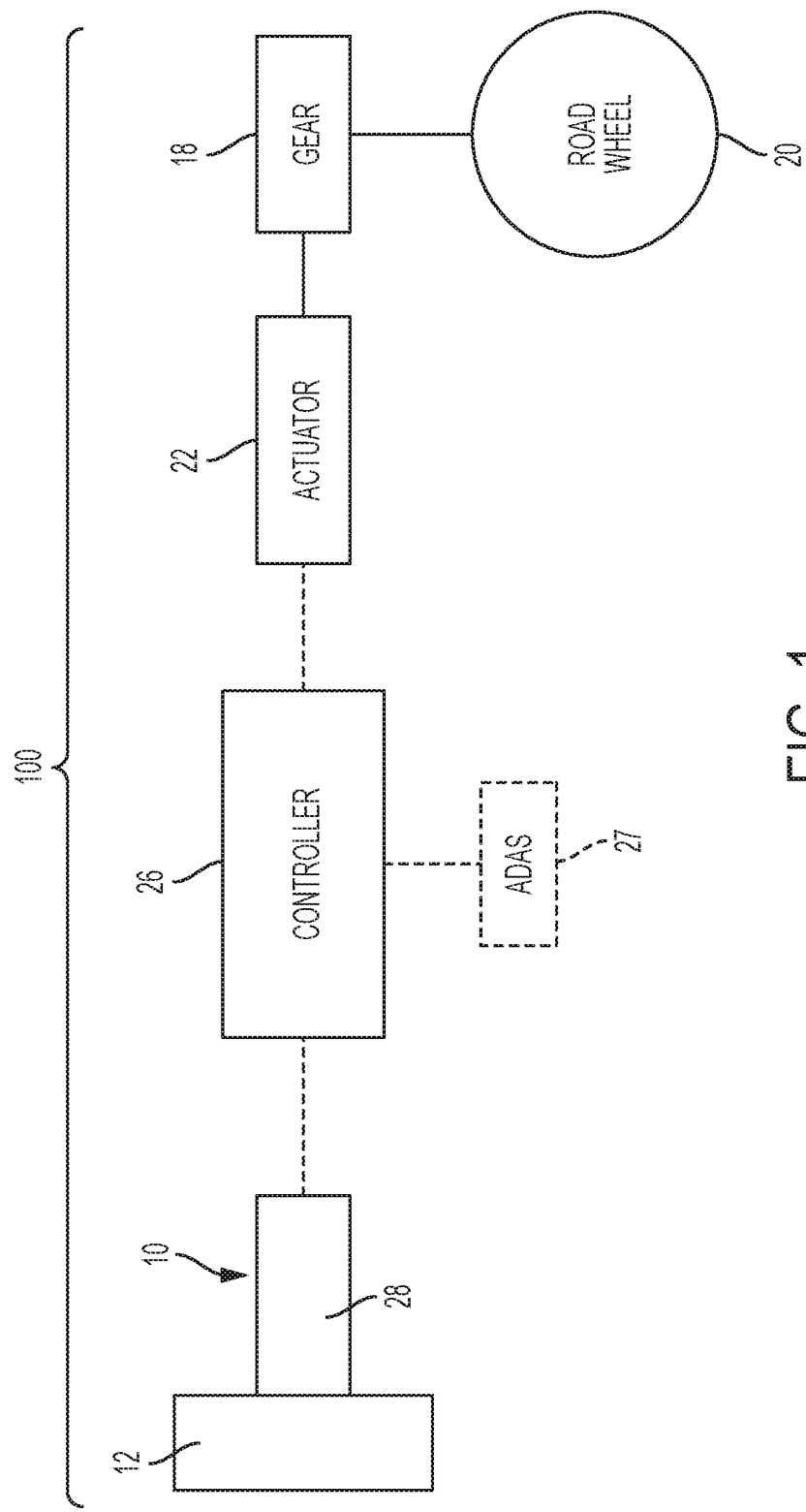
FIG. 1 schematically illustrates an embodiment of a steer-by-wire vehicle having a torque feedback system.

Referring now to the Figures, where the invention will be described with reference to specific embodiments, without limiting same, a torque feedback system 10 for a steering wheel 12 in a vehicle 100 that is alternatively a conventional vehicle 100 that is a steer-by-wire vehicle 100, or as further described herein, an autonomous or semi-autonomous vehicle 100 having a steer-by-wire system. It will be appreciated that the steer-by-wire system shown and described can be used in an autonomous or semi-autonomous vehicle or in a more conventional vehicle. The torque feedback system 10 provides a cost-effective torque feedback system for steer-by-wire vehicle 100, which includes a controller 26. Although not required, the controller 26 may also be associated with an autonomous or semi-autonomous vehicle utilizing an advanced driver assistance system ("ADAS") 27, thus converting a conventional steer-by-wire vehicle into an autonomous or semi-autonomous vehicle. The ADAS system 27 may utilize a navigation system that enables the vehicle 100 and its passengers to drive portal-to-portal without ever having the operator steer the vehicle 100. When the ADAS system 27 is activated, the steering wheel 12 is not required for control of the vehicle 100, and therefore, rotation of the steering wheel 12 is not required during the autonomous driving mode.

The steer-by-wire vehicle 100 does not include a mechanical connection between the steering wheel 12 and a steering gear 18, such as electric power steering gear, which is operatively coupled to a plurality of road wheels 20. However, the steering wheel 12 and steering gear 18 are electrically coupled. Guidance of the vehicle 100 is performed by use of the steering gear 18, with an input shaft that is rotated by an actuator 22, such as a servo actuator. In an embodiment that includes the ADAS system 27, in a non-active mode of the ADAS system 27, the actuator 22 receives an electronic communication signal of rotation of the steering wheel 12 by the driver.

The ADAS system 27 is configured to be activated when an autonomous vehicle driving condition is desired, thereby deactivating directional control of the road wheels 20 by the steering wheel 12. The driver is able to switch between the autonomous vehicle driving condition and a non-autonomous vehicle driving condition.

The non-autonomous vehicle driving condition (non-active mode of ADAS system 27, if ADAS system 27 is included) includes a driver controlling the steering wheel 12 to directionally control the vehicle 100. As noted above, in a non-active mode of the ADAS system 27, the actuator 22 receives an electronic communication signal of rotation of the steering wheel 12 by the driver. However, due to the lack of mechanical connection between the steering wheel 12 and the road wheels 20, the driver is not provided with a feel for the road without torque feedback, which has previously been provided by torque and rotation servo-actuators, which apply tactile feedback in the form of torque to the steering wheel 12 and are coupled to the steering wheel 12 and/or the steering column 28. In lieu of another servo actuator coupled to the steering column 28 and steering wheel 12 to provide tactile feedback in the form of torque to the steering wheel 12 to simulate the driver's feel of the road, the torque feedback system 10 is provided, as will be further described below with respect to FIG. 2.

The vehicle 100 in embodiments described herein includes a less costly alternative to servo-actuators in the torque feedback system 10 in order to provide some representation of the feel of the road using torque feedback.

Figure 2:
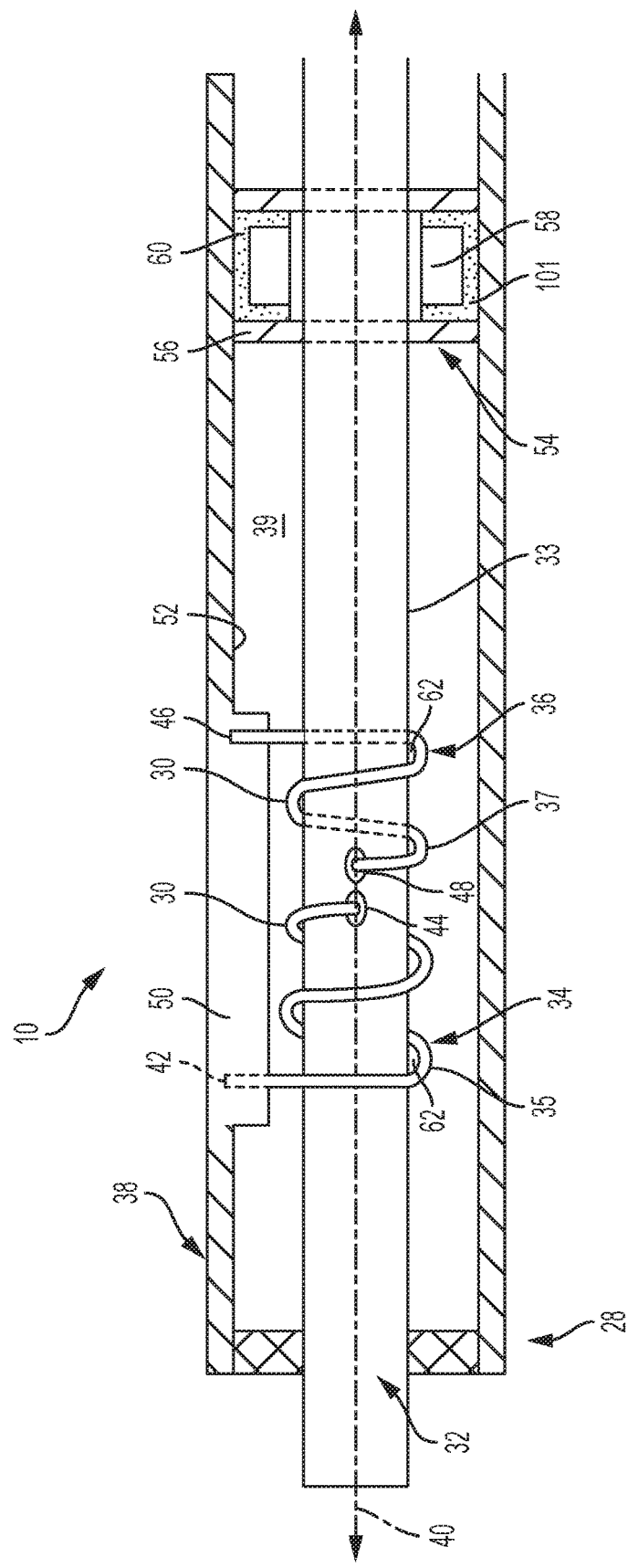
FIG. 2 schematically illustrates an embodiment of a steering column for the vehicle of FIG. 1.
Figure 3A:
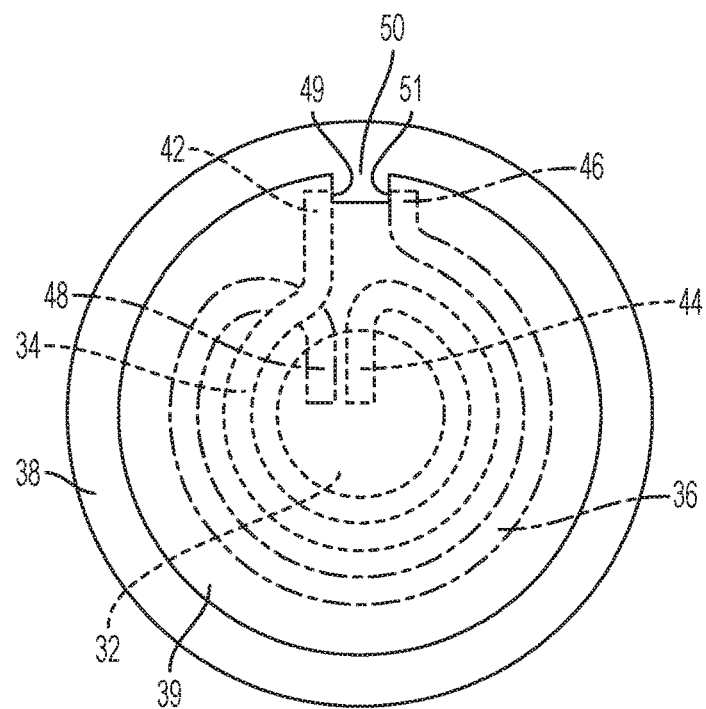
FIG. 3A schematically illustrates a sectional view of the steering column of FIG. 2 in a non-rotated condition, and FIG. 3B schematically illustrates a sectional view of the steering column of FIG. 2 when rotated in a first rotational direction.
Figure 3B:
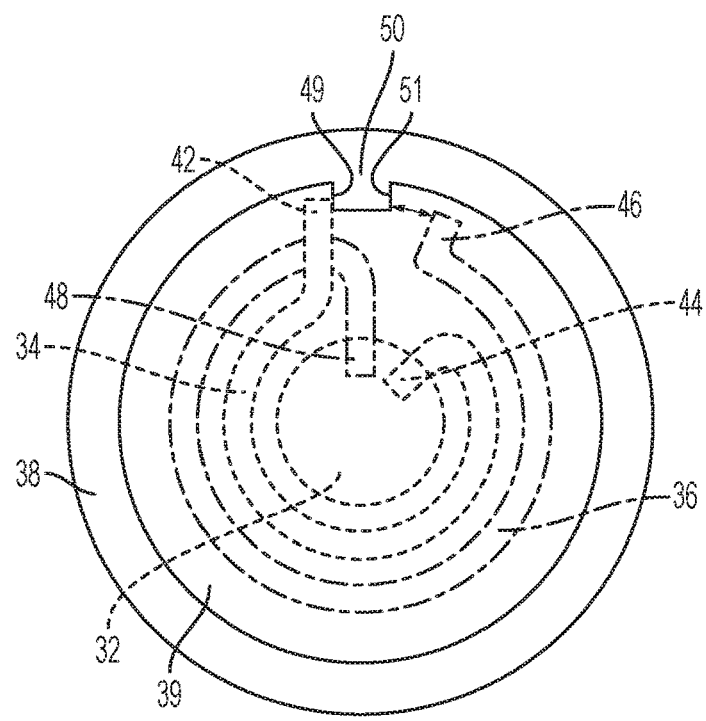

With reference now to FIGS. 2 and 3A-3B, the feedback system 10 includes at least one mechanical energy storing element, such as, but not limited to, at least one spring 30, attached to the steering shaft 32 of the steering column 28 for torque feedback in both clockwise and counter-clockwise rotation. In the illustrated embodiment, the mechanical energy storing element includes two torsion springs 30. At least a portion of each of the torsion springs 30 are wrapped around the steering shaft 32, helically or spirally, with respect to a longitudinal axis 40 of the steering shaft 32. The torsion springs 30 may be protected by an outer jacket 38, which may also form part of the steering column 28. The torsion springs 30 are provided in an annulus 39 between the jacket 38 and the shaft 32. The shaft 32 may rotate with respect to the jacket 38. The torsion springs 30 include at least a first torsion spring 34 and a second torsion spring 36. In FIGS. 3A and 3B, the first and second torsion springs 34, 36 are illustrated as having different diameters for clarity, however the diameters of the first and second torsion springs 34, 36 may alternatively be the same or substantially the same, as shown in FIG. 2. Additional torsion springs 34, 36 may be provided along the longitudinal axis 40. The jacket 38 is illustrated with a thickened contact portion 50 to which the first ends 42, 46 of the torsion springs 34, 36, respectively, are engageable with or may be separable from, as will be further described below. Alternatively, the jacket 38 may include separate contact portions 50 for each torsion spring 34, 36, and the contact portions 50 may be provided on different areas of the interior surface 52 of the jacket 38, such as, but not limited to, a diametrically opposite area of the interior surface 52. The contact portion 50 may protrude radially inward towards the steering shaft 32, and provides a first stop surface 49, and an opposite second stop surface 51.

When the steering shaft 32 is on center (a non-rotated condition of the steering shaft 32), as illustrated in FIG. 3A, the first end 42 of the first torsion spring 34 contacts the first stop surface 49 of the contact portion 50 of the jacket 38. Also as shown in FIG. 3A, the first end 46 of the second torsion spring 36 contacts the second stop surface 51 of the contact portion 50 of the jacket 38. While engageable with the contact portion 50, the first ends 42, 46 may also be separable from the contact portion 50 during rotation of the steering shaft 32, as will be further described below. A second end 44 of the first torsion spring 34 is attached to the steering shaft 32, with turns 35 wrapping around the shaft 32 in a first direction, such as one of a clockwise or counter-clockwise direction, from the first end 42 to the second end 44. A second end 48 of the second torsion spring 36 is attached to the steering shaft 32, with turns 37 wrapping around the shaft 32 in a second direction opposite the first direction, such as the other of a clockwise or counter-clockwise direction, from the first end 46 to the second end 48. The second torsion spring 36 is longitudinally spaced from the first torsion spring 34. That is, in one embodiment, the first and second torsion springs 34, 36 occupy separate longitudinal sections along the longitudinal axis 40 of the steering shaft 32. Also, the torsion springs 30 may have turns 35, 37 that are spaced from the outer surface 33 of the shaft 32. Spaces 62 may be disposed between the outer surface 33 of the shaft 32 and the torsion springs 30. The torsion springs 30 may be helically wound, such that a diameter of the springs 30 is substantially constant. In an alternative embodiment, the torsion springs 30 may be spirally wound, such that a diameter of the springs 30 decreases from the first ends 42, 46 to the second ends 44, 48, spiraling towards the shaft 32 as in a conical helix, or as a substantially planar spiral.

When the steering wheel 12 is rotated in a first rotational direction, such as in a clockwise direction or a "right turn" as shown in FIG. 3B, the shaft 32 will correspondingly turn in the first rotational direction, carrying the second ends 44, 48 of the first and second torsion springs 34, 36, respectively, in the first rotational direction. Movement of the second end 48 of the second torsion spring 36 in the first rotational direction will reduce or eliminate the load on the second torsion spring 36. For example, as illustrated, the first end 46 of the second torsion spring 36 may move away and be separated from the second stop surface 51 of the contact portion 50. Thus, when the steering wheel 12 is rotated in the first rotational direction, the second torsion spring 36 becomes unloaded, or the load becomes at least substantially reduced. As shown, the first end 46 of the second torsion spring 36 exerts no force on the contact portion 50. However, as the shaft 32 is turned in the first rotational direction, the first end 42 of the first torsion spring 34 maintains contact with the first stop surface 49 of the contact portion 50 and provides resistance to continued rotation of the shaft 32 as the load is increased on the first torsion spring 34. The first end 42 of the first torsion spring 34, when the shaft 32 is turned in the second rotational direction, thus exerts an increased force on the contact portion 50 as compared to the non-rotated condition of the shaft 32 depicted in FIG. 3A. Likewise, when the steering wheel 12 is rotated in a second rotational direction, such as in a counter-clockwise direction or a "left turn," the shaft 32 will correspondingly turn in the second rotational direction, carrying the second ends 44, 48 of the first and second torsion springs 34, 36, respectively, in the second rotational direction. Movement of the second end 44 of the first torsion spring 34 in the second rotational direction will reduce or eliminate the load on the first torsion spring 34 as the first end 42 of the first torsion spring 34 is moved away and separates from the first stop surface 49 of the contact portion 50. However, as the shaft 32 is turned in the second rotational direction, the first end 46 of the second torsion spring 36 maintains contact with the second stop surface 51 of the contact portion 50 and provides resistance to continued rotation of the shaft 32 in the second rotational direction as the load is increased on the second torsion spring 36. The first end 46 of the second torsion spring 36, when the shaft 32 is turned in the second rotational direction, thus exerts an increased force on the contact portion 50 as compared to the non-rotated condition of the shaft 32 depicted in FIG. 3A. Thus, rotation in each direction of the steering wheel 12 provides torque feedback in both clockwise and counter-clockwise rotational directions.

In addition, an embodiment of the feedback system 10 may further include a damper 54 to provide damping of any oscillations experienced by the steering column 32 to reduce unwanted oscillation, and may further provide additional torque feedback that is rotation speed dependent. The damper 54 may be a friction damper, which is motion dependent, but not speed dependent, or a viscous damper which is speed dependent. One embodiment of the damper 54 is damper 101, which is a viscous damper. The damper 101 may include a damper housing 56 attached between the jacket 38 and the shaft 32. The housing 56 encloses a ring 58 and a viscous substance or material such as fluid 60 therein, as well as a portion of the shaft 32 between longitudinal spaced portions of the damper housing 56. The damper 101 provides a torsional vibration damping effect by resilient, damped coupling of the ring 58 to the shaft 32, and which is dependent on the rotation speed of the shaft 32. In another embodiment, the torque feedback system 10 includes both a friction damper and a viscous damper, or multiple embodiments of one or both friction dampers and viscous dampers, as needed. Alternative and additional types of dampers 54 employable within the torque feedback system 10 are described with respect to FIGS. 4-11.

Figure 4:
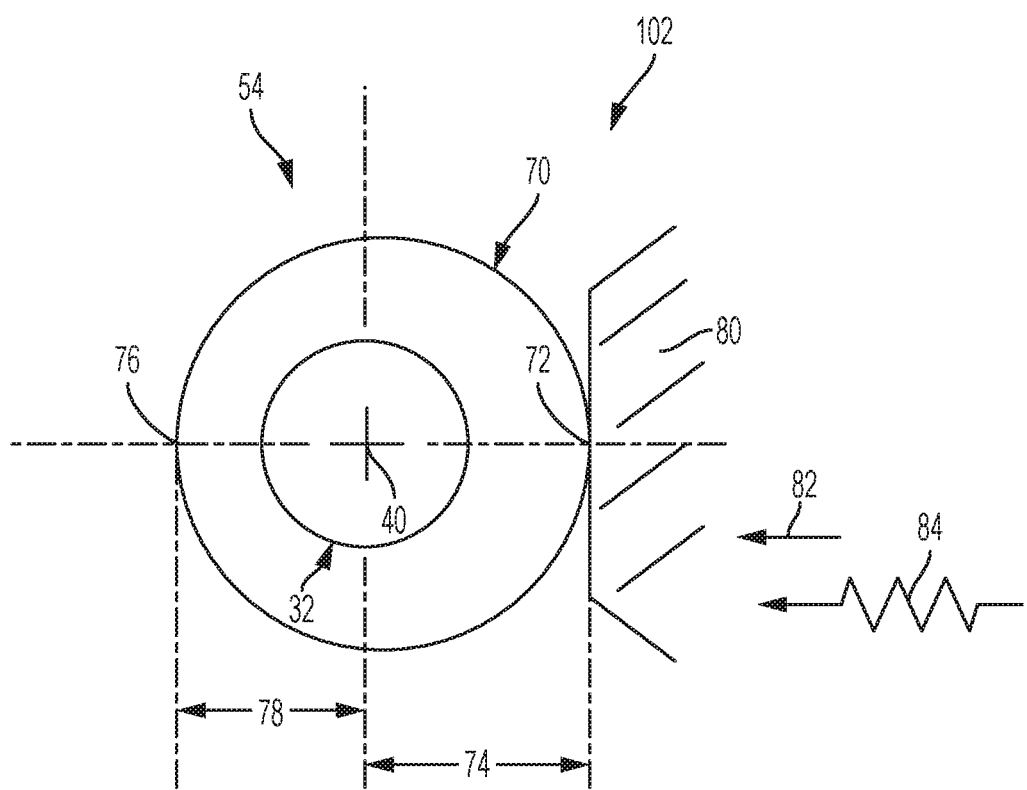
FIG. 4 schematically illustrates a cross-sectional view of a steering shaft having one embodiment of a friction damper.

FIG. 4 illustrates another embodiment of the damper 54 for the torque feedback system 10. Damper 102 shown in FIG. 3 is one embodiment of a friction damper for passive return to center of the steering column shaft 32. The damper 102 includes an eccentric cam 70 surrounding the steering column shaft 32. The damper 102 is depicted in the straight ahead driving position or resting position, where the steering column shaft 32 is not rotated. The eccentric cam 70 includes a first peripheral portion 72, a "high point," at a first distance 74 from the longitudinal axis 40 of the steering shaft 32, and a second peripheral portion 76, a "low point," at a second distance 78 from the longitudinal axis 40 of the steering shaft 32. The first distance 74 is greater than the second distance 78. The first peripheral portion 72 may further include a flat portion to provide a partial "on-center" detent. In the resting position shown, the first peripheral portion 72 of the eccentric cam 70 is contacted by a friction shoe 80. The friction shoe 80 is biased towards the eccentric cam 70 and utilizes a force 82, such as a spring force deliverable by a spring 84, towards the eccentric cam 70. When the steering shaft 32 is rotated +/−180 degrees, the second peripheral portion 76 is contacted by the friction shoe 80. Because the second distance 78 is less than the first distance 74, the damper 102 will provide a different, such as higher, damping force when the steering shaft 32 is at the center position and when the first peripheral portion 72 is contacted by the friction shoe 80 than when the steering shaft 32 is at the +/−180 degree position with the second peripheral portion 76 contacted by the friction shoe 80. Thus, a different, such as lower, damping force when the second peripheral portion 76 is at the +/−180 degree position provides a faster return to center of the steering shaft 32, with different, such as higher, damping as the first peripheral portion 72 engages with the friction shoe 80. Thus, the springs 30 return the steering wheel 12 to the center position but the friction damper 102 provides friction so the wheel 12 doesn't oscillate, and the flat portion of the first peripheral portion 72 helps maintain the on-center position. Similar to vehicles with mechanically connected steering wheels, when the steering wheel 12 is turned and then released, the wheel 12 will tend to return to the center position. The torque feedback system 10 with friction damper 102, as well as the other dampers 54 described herein, will accomplish a substantially similar result in the steer-by-wire vehicle 100.

Figure 5:
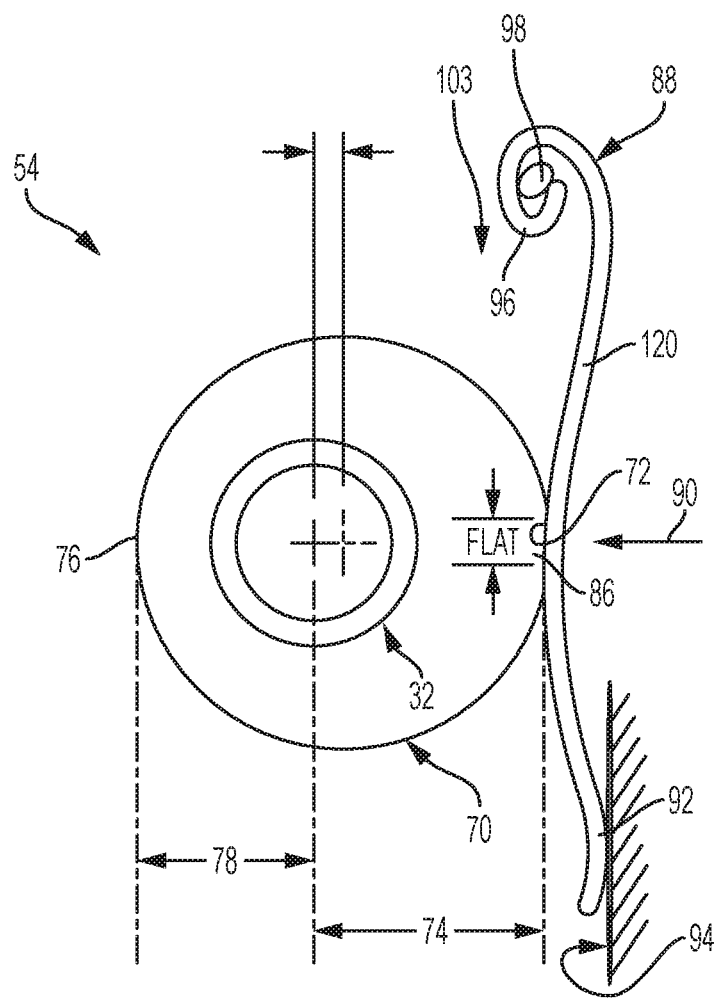
FIG. 5 schematically illustrates a cross-sectional view of a steering shaft having another embodiment of a friction damper.

FIG. 5 illustrates another embodiment of a damper 54 for the torque feedback system 10. Damper 103 shown in FIG. 5 is another embodiment of a friction damper for passive return to center of the steering column shaft 32. The damper 103 includes an eccentric cam 70 surrounding the steering column shaft 32. The damper 103 is depicted in the straight ahead driving position or resting position, where the steering shaft 32 is not rotated. As previously described with reference to damper 102, eccentric cam 70 includes a first peripheral portion 72, a "high point," at a first distance 74 from the longitudinal axis 40 of the steering shaft 32, and a second peripheral portion 76, a "low point," at a second distance 78 from the longitudinal axis 40 of the steering shaft 32. The first distance 74 is greater than the second distance 78. The first peripheral portion 72 may further include a flat portion 86 to provide a partial "on-center" detent. In the resting position shown, the first peripheral portion 72 of the eccentric cam 70 is contacted by a leaf spring 88 that provides force 90 against the cam 70. A first end portion 92 of the leaf spring 88 is attached to a surface 94, such as a flat reaction surface. A second end portion 96 of the leaf spring 88 is wrapped around a retaining pin 98. An intermediate portion 120 of the leaf spring 88, between the first and second end portions, 92, 96 is biased inwardly towards the eccentric cam 70 and steering shaft 32 to provide the force 90 against the cam 70. The force 90 varies depending on which peripheral portion 72, 76 is pressing against the leaf spring 88. The damping force is different, such as higher, when the first peripheral portion 72 is pressing against the leaf spring 88 than when the second peripheral portion 76 is pressing against the leaf spring 88.

Figure 6:
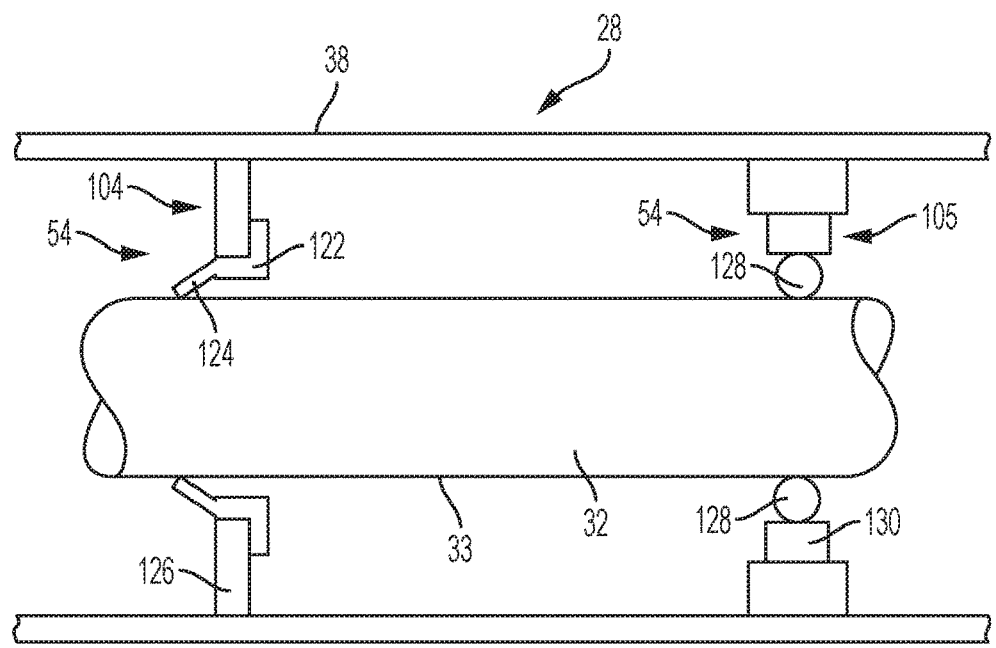
FIG. 6 schematically illustrates an embodiment of a steering column shaft having alternate embodiments of a friction damper.

Turning now to FIG. 6, the steering shaft 32 is shown as including a passive return to center steering column 28 with friction damping, where energy is absorbed through sliding friction, for the steer by wire vehicle 100. The damper 54 included within the torque feedback system 10 (see FIG. 2) may include a damper 104 having a lip seal 122, which is a radial shaft seal that radially contacts the outer surface 33 of the shaft 32. The lip seal 122 includes, but is not limited to, an elastomer material. The lip seal 122 includes a flexible portion 124 that rubs against the steering shaft 32 when the steering shaft 32 rotates. The damper 104 may further include an attachment portion 126 for attaching the flexible portion 124 to the jacket 38.

Figure 7:
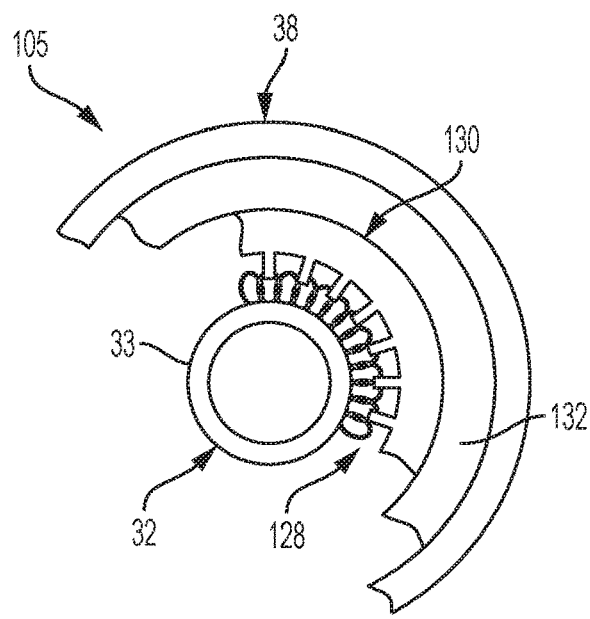
FIG. 7 schematically illustrates a portion of a cross-sectional view of a steering shaft having one of the embodiments of a friction damper of FIG. 6.

The damper 54 included within the torque feedback system 10 depicted in FIGS. 6 and 7 may also, or alternatively, include a damper 105 having a garter spring 128 (spring connected at each end to create a circular shape) to create friction damping. The garter spring 128 surrounds the outer surface 33 of the shaft 32 as shown in FIG. 7, which in turn is surrounded by a slotted inner diameter ring 130 to maintain the garter spring 128 from spinning with respect to the outer jacket 38. An adapter 132 may further be utilized to span the gap between the ring 130 and the jacket 38.

Figure 8:
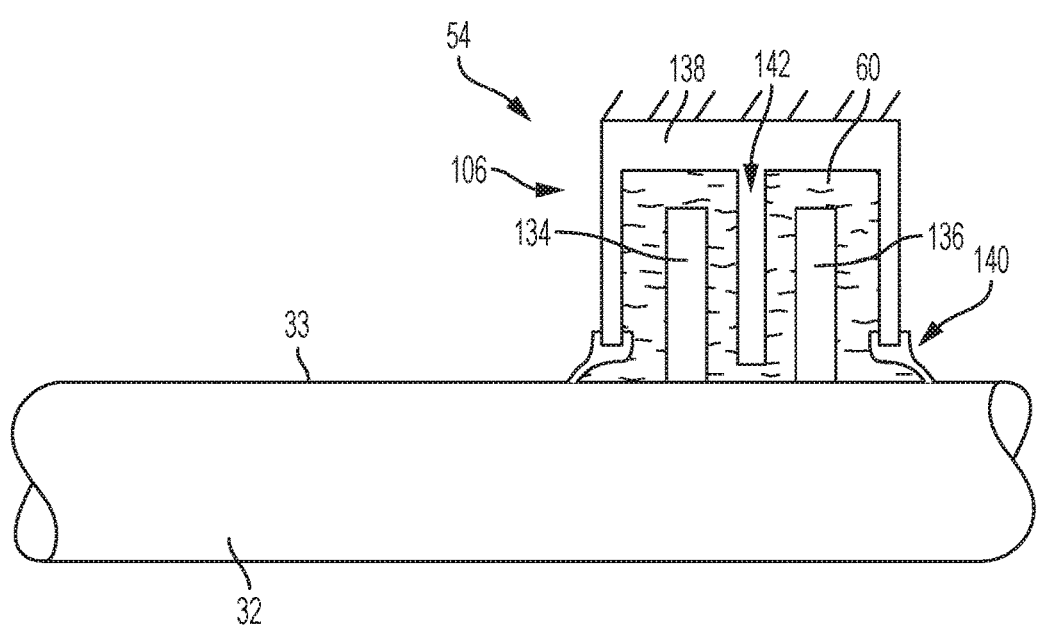
FIG. 8 schematically illustrates a sectional view of a steering shaft having one embodiment of a viscous damper.

FIG. 8 illustrates another embodiment of a damper 54, in this case a viscous damper. The damper 106 of FIG. 8 is similar to the damper 101 shown in FIG. 2, except instead of ring 58, the damper 106 includes a plurality of dynamic fins 134, 136, shaped as plates attached to the steering shaft 32, which are movable within the viscous fluid 60, such as, but not limited to, a silicone fluid, to create a damping effect as the dynamic fins 134, 136 move through the fluid 60 while the steering shaft 32 rotates. A housing 138 encloses the fluid 60 around the dynamic fins 134, 136, with a seal 140 contacting the outer surface 33 so that the fluid 60 cannot escape the housing 138 and the steering shaft 32 and dynamic fins 134, 136 can move with respect to the housing 138 and fluid 60. One or more static fins 142 may extend from the housing 138 and between adjacent dynamic fins 134, 136 as shown. While only depicted on one side of the steering shaft 32, it should be understood that the housing 138 radially surrounds the steering shaft 32.

Figure 9:
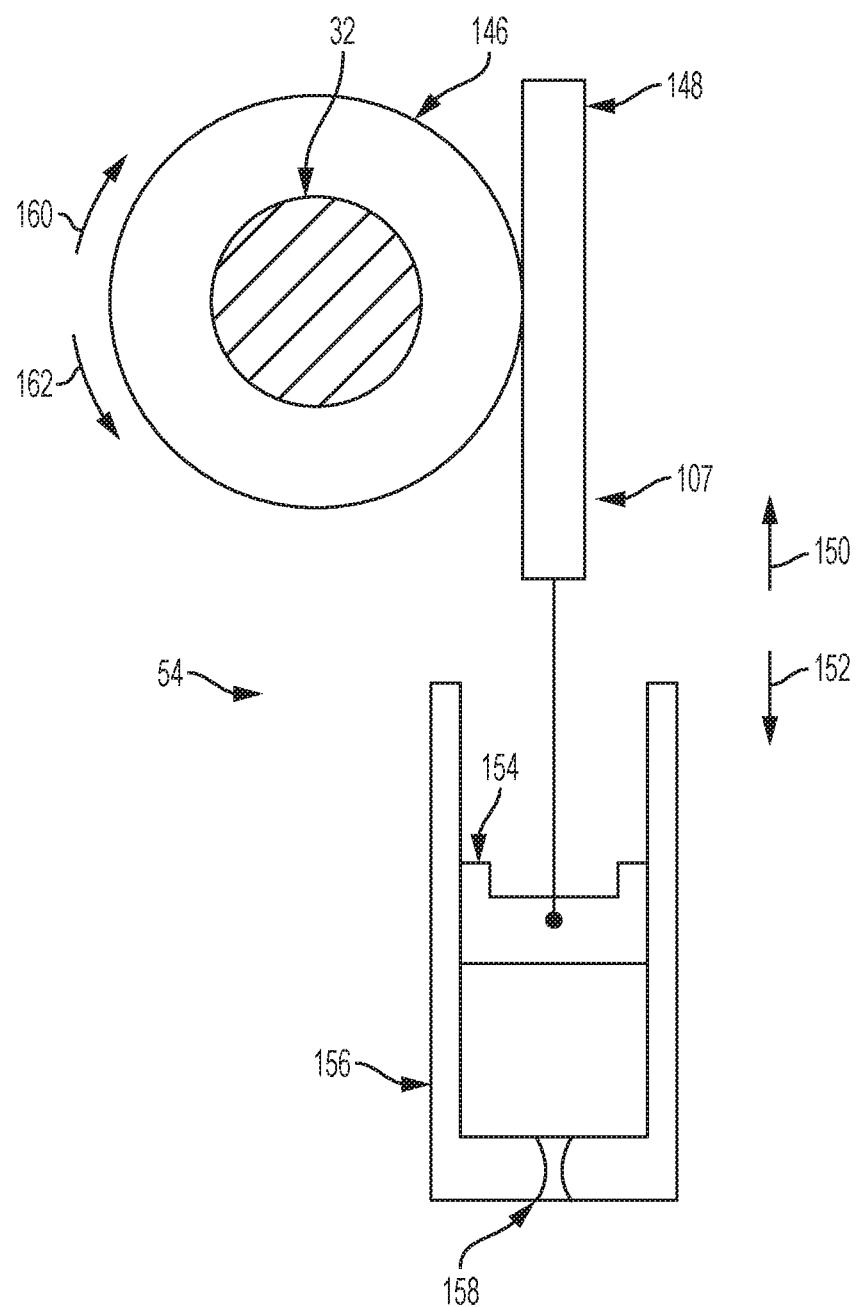
FIG. 9 schematically illustrates a portion of a cross-sectional view of a steering shaft having another embodiment of a viscous damper.

FIG. 9 illustrates another embodiment of a damper 54. The damper 107 of FIG. 9 is a viscous damper that employs a pinion 146 surrounding the steering shaft 32. Rotation of the steering shaft 32 correspondingly rotates the pinion 146, which engages a rack 148 to linearly move the rack 148 in directions 150, 152. The rack 148 is connected to a piston 154 that moves longitudinally with the rack 148 and within cylinder 156. The cylinder 156 includes an orifice 158 to allow air pressure within cylinder 156 to be released as the piston 154 moves further in direction 152 within the cylinder 156, and allows air to return to the cylinder 156 when the piston 154 moves further in direction 150. Thus, movement of the steering shaft 32 in either rotational direction 160, 162 is damped by the cylinder 156 and piston 154. In another embodiment, a second piston 154 may be attached to the opposite end of the rack 148 and movable within a second cylinder 156.

Figure 10:
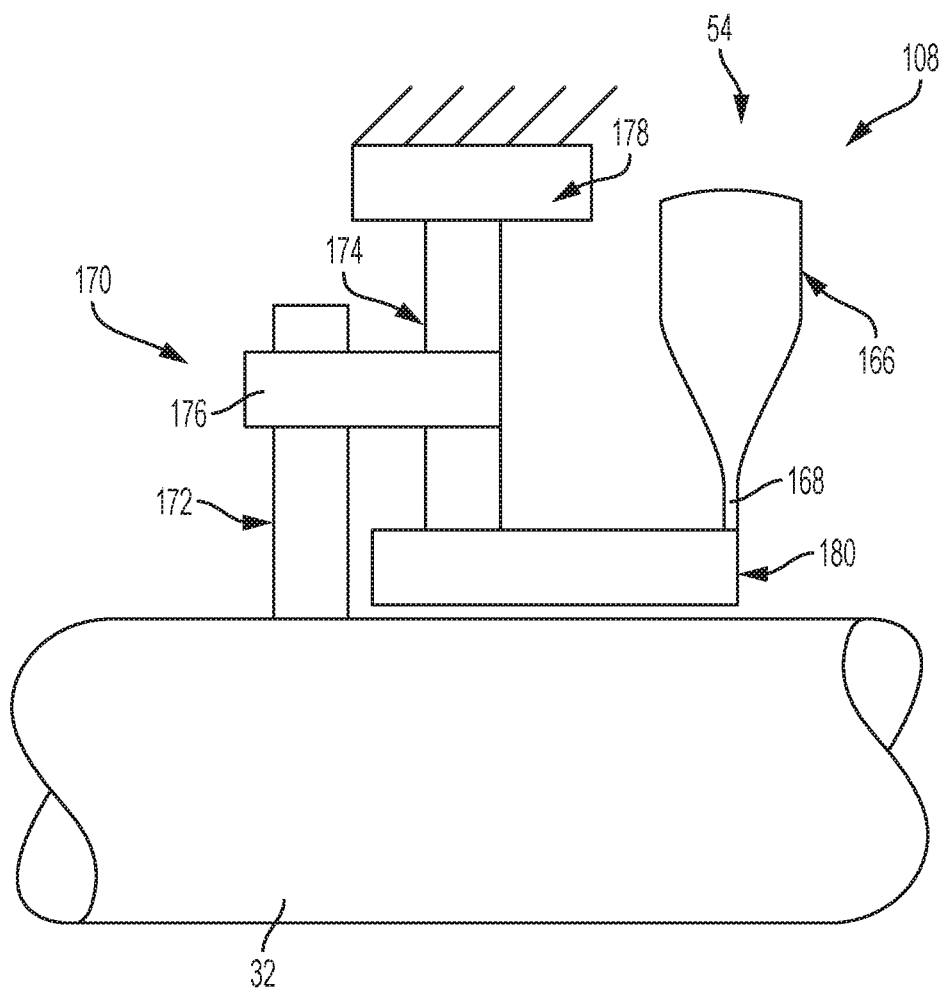
FIG. 10 schematically illustrates a sectional view of a steering shaft having another embodiment of a viscous damper; and, FIG. 11 schematically illustrates a sectional view of a steering shaft having still another embodiment of a viscous damper.

FIG. 10 illustrates yet another embodiment of a damper 54. The damper 108 illustrated in FIG. 10 is a viscous damper that employs one or more fan blades 166 to create a resistance as the steering shaft 32 is rotated about its longitudinal axis 40, thus providing a damping effect. In one embodiment, an end 168 of the fan blade 166 may be attached to a planetary gear system 170. While planetary gear system 170 may include varying arrangements of gears, the illustrated planetary gear system 170 includes a carrier ring 172 attached to the steering shaft 32, which is rotatably connected to a planet gear 174, through connection 176. Ring gear 178 is fixed to "ground" such as the jacket 38. Rotation of the planet gear 174 rotates a sun gear 180. The end 168 of the fan blade 166 is attached to the sun gear 180, and the fan blade 166 spins with the sun gear 180.

Figure 11:
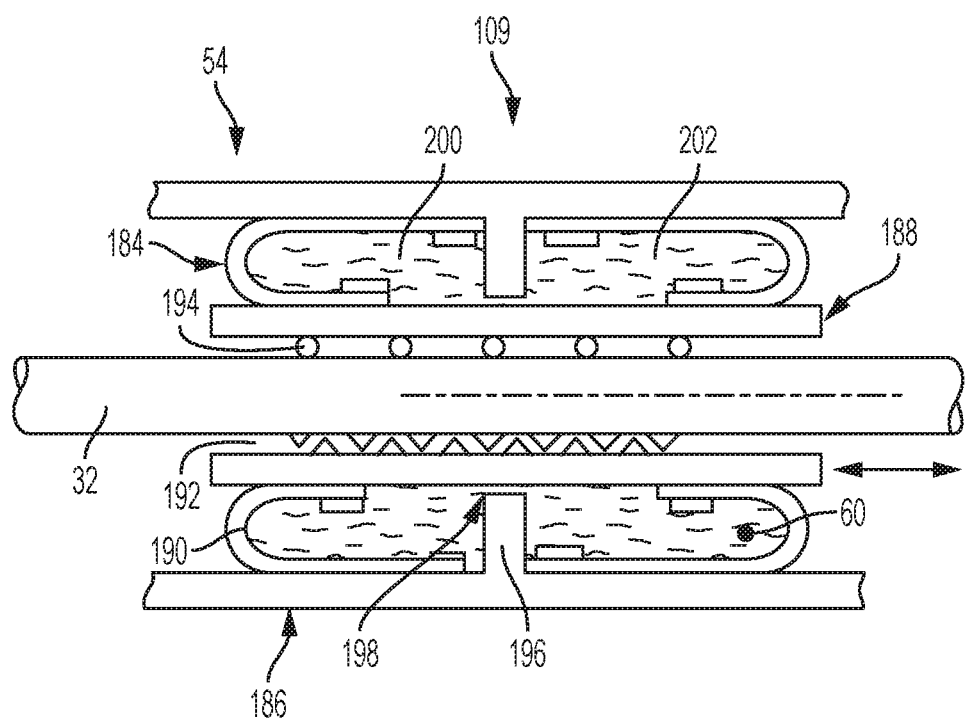

FIG. 11 illustrates still another embodiment of a damper 54. The damper 109 illustrated in FIG. 11 is a viscous damper that uses a rolling diaphragm 184 that contains a viscous substance 60, such as, but not limited to, silicone fluid. A cylinder 186 is attached to the jacket 38. Attached between the cylinder 186 and a linearly movable nut 188 is the rolling diaphragm 184. The rolling diaphragm 184 includes a flexible bladder 190 containing the viscous substance 60. A flange 196 extends radially inwardly from the cylinder 186 towards the nut 188. An orifice 198 between the flange 196 and the nut 188 allows fluidic communication between a first longitudinal area 200 of the diaphragm 184 and a second longitudinal area 202 of the diaphragm 184. Rotation of the steering shaft 32 linearly moves the nut 188, and the nut 188 is restricted from rotating with the steering shaft 32. The steering shaft 32 and nut 188 may have V-threads 192 there between, a ball screw connection with balls 194 there between, or other shaft-to-nut engagements for converting rotary motion of the steering shaft 32 to linear motion of the nut 188. While both V-threads 192 and balls 194 are illustrated in FIG. 11, it should be understood that only one of the V-threads 192, balls 194, or other shaft-to-nut engagements would be included within a longitudinal section between the nut 188 and shaft 32. Movement of the steering shaft 32 in either rotational direction 160, 162 (FIG. 9) will move the diaphragm 184 with respect to the cylinder 186 against the resistance of the viscous fluid 60, which can move from the first area 200 to the second area 202 and from the second area 202 to the first area 200 via the orifice 198, thus providing a damping effect on the steering shaft 32.

In one embodiment, the total rotation of the steering wheel 12 (and thus steering shaft 32) in the driver-steering mode (ADAS system 27, if included, in non-activated condition) may be less than one complete rotation in either the clockwise or counterclockwise directions. The actuator 22 can be designed to actuate the gear 18 to turn the road wheels 20 an appropriate amount in response to incremental movement of the steering wheel 12.

Thus, a cost effective solution is provided to allow torque feedback in both clockwise and counterclockwise directions for a steer-by-wire vehicle 100, and the embodiments described herein may be advantageously incorporated in the vehicle 100 having autonomous or semi-autonomous capabilities. A method of providing torque feedback to a driver includes increasing load on a first torsion spring 34 about the steering shaft 32 and reducing load on the second torsion spring 36 about the steering shaft 32 during rotation of the steering wheel 12 in a first direction; and increasing load on the second torsion spring 36 about the steering shaft 32 and reducing load on the first torsion spring 34 about the steering shaft 32 during rotation of the steering wheel 12 in a second direction opposite the first direction. Rotation of the shaft 32 in either clockwise or counterclockwise directions from a zero position causes the mechanical energy storing element to be placed under a load, and an increased force is exerted on the contact portion 50. Additionally, a damper 54 provides damping of oscillations experienced by the steering column 32 that may occur due to the torsion springs 30.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A torque feedback system for a vehicle comprising:
a steering shaft having a longitudinal axis;
a jacket surrounding the shaft, the jacket including a contact portion, the shaft rotatable with respect to the jacket; and,
at least one mechanical energy storing element arranged to provide torque feedback when the steering shaft is rotated, the at least one mechanical energy storing element including a first mechanical energy storing element having a first end engageable with the jacket and a second end engageable with the shaft, and a second mechanical energy storing element having a first end engageable with the jacket and a second end engageable with the shaft, the first mechanical energy storing element torsion spring provides resistance to rotation of the shaft in a first rotational direction, and the second mechanical energy storing element provides resistance to rotation of the shaft in a second rotational direction;
wherein rotation of the shaft in the first rotational direction separates the first end of the second mechanical energy storing element from the contact portion while maintaining contact of the first end of the first mechanical energy storing element with the contact portion, and rotation of the shaft in the second rotational direction separates the first end of the first mechanical energy storing element from the contact portion while maintaining contact of the first end of the second mechanical energy storing element with the contact portion.

2. The torque feedback system of claim 1, wherein the first mechanical energy storing element is a first torsion spring, and the second mechanical energy storing element is a second torsion spring, wherein the second ends of the first and second torsion springs are connected to the shaft.

3. The torque feedback system of claim 2, wherein the first end of the first torsion spring and the first end of the second torsion spring contact the contact portion in a non-rotated condition of the shaft.

4. A torque feedback system for a vehicle comprising:
a steering shaft having a longitudinal axis;
a jacket surrounding the shaft, the jacket including a contact portion, the shaft rotatable with respect to the jacket; and,
at least one mechanical energy storing element arranged to provide torque feedback when the steering shaft is rotated, the at least one mechanical energy storing element including a first torsion spring having a first end engageable with the jacket and a second end connected to the shaft, and a second torsion spring having a first end engageable with the jacket and a second end connected to the shaft, the first torsion spring provides resistance to rotation of the shaft in a first rotational direction, and the second torsion spring provides resistance to rotation of the shaft in a second rotational direction;
wherein the first end of the first torsion spring and the first end of the second torsion spring contact the contact portion in a non-rotated condition of the shaft, rotation of the shaft in the first rotational direction maintains contact of the first end of the first torsion spring on the contact portion and separates the first end of the second torsion spring from the contact portion, and rotation of the shaft in the second rotational direction separates the first end of the first torsion spring from the contact portion and maintains contact of the first end of the second torsion spring on the contact portion.

5. The torque feedback system of claim 4, wherein the first torsion spring is wound in a first direction around the shaft, and the second torsion spring is wound in a second direction around the shaft, the second direction opposite the first direction.

6. The torque feedback system of claim 4, wherein rotation of the shaft in the first rotational direction increases a force of the first end of the first torsion spring on the contact portion and unloads the second torsion spring, and rotation of the shaft in the second rotational direction unloads the first torsion spring and increases a force of the first end of the second torsion spring on the contact portion.

7. The torque feedback system of claim 4, wherein the torque feedback system is disposed in an autonomous or semi-autonomous vehicle.

8. The torque feedback system of claim 4, further comprising a damper configured to damp oscillations of the at least one spring, the damper including one of a viscous damper and a friction damper.

9. The torque feedback system of claim 8, wherein the damper includes a damper housing surrounding at least a portion of the shaft, a movable member movable with the shaft and with respect to the housing, and fluid disposed within the damper housing.

10. A vehicle comprising:
a steering wheel; and,
a steering column including the torque feedback system of claim 4, the at least one first spring wound in a first direction around the shaft.

11. The vehicle of claim 10, the at least one second spring wound in a second direction around the shaft, the second direction opposite the first direction.

12. The vehicle of claim 10, wherein the vehicle is an autonomous or semi-autonomous vehicle having a steer-by-wire system, and further comprises an actuator operatively connected to road wheels of the vehicle, the actuator electrically connected to the steering column in a driver-operated mode of the vehicle and electrically disconnected from the steering shaft in an activated autonomous mode.

13. The vehicle of claim 10, wherein the steering column further includes a damper configured to damp oscillations of the first torsion spring.

14. A method of providing torque feedback to a driver of a vehicle utilizing the torque feedback system of claim 4, the method comprising:
providing the steering shaft in the non-rotated condition, the first end of the first torsion spring engaged with the contact portion of the jacket, the second end of the first torsion spring attached to the steering shaft, the first end of the second torsion spring engaged with the contact portion of the jacket, the second end of the second torsion spring attached to the steering shaft;
rotating the steering shaft in the first rotational direction;
increasing a force applied by the first end of the first torsion spring on the contact portion while rotating the steering shaft in the first rotational direction;
rotating the steering shaft in the second rotational direction opposite the first rotational direction; and,
increasing a force applied by the first end of the second torsion spring on the contact portion while rotating the steering shaft in the second rotational direction.

15. The method of claim 14, further comprising damping oscillations of the first and second torsion springs using a damper at least partially surrounding the steering shaft.

16. A torque feedback system for a vehicle comprising:
a steering shaft having a longitudinal axis;
a jacket surrounding the shaft, the shaft rotatable with respect to the jacket; and
at least one mechanical energy storing element arranged to provide torque feedback when the steering shaft is rotated, the at least one mechanical energy storing element including a first mechanical energy storing element having a first end engageable with the jacket and a second end engageable with the shaft, and a second mechanical energy storing element having a first end engageable with the jacket and a second end engageable with the shaft, the first mechanical energy storing element provides resistance to rotation of the shaft in a first rotational direction, and the second mechanical energy storing element provides resistance to rotation of the shaft in a second rotational direction, the mechanical energy storing element including at least one spring having a first end engageable with the jacket surrounding the shaft and a second end attached to the shaft; and
a damper configured to damp oscillations of the at least one spring, the damper including one of a viscous damper and a friction damper, wherein the damper includes a piston linearly movable within a cylinder in response to rotational movement of the steering shaft.

17. A torque feedback system for a vehicle comprising:
a steering shaft having a longitudinal axis;
a jacket surrounding the shaft, the shaft rotatable with respect to the jacket; and
at least one mechanical energy storing element arranged to provide torque feedback when the steering shaft is rotated, the at least one mechanical energy storing element including a first mechanical energy storing element having a first end engageable with the jacket and a second end engageable with the shaft, and a second mechanical energy storing element having a first end engageable with the jacket and a second end engageable with the shaft, the first mechanical energy storing element provides resistance to rotation of the shaft in a first rotational direction, and the second mechanical energy storing element provides resistance to rotation of the shaft in a second rotational direction, the mechanical energy storing element including at least one spring having a first end engageable with the jacket surrounding the shaft and a second end attached to the shaft; and
a damper configured to damp oscillations of the at least one spring, the damper including one of a viscous damper and a friction damper, wherein the damper includes a fan blade.

18. A torque feedback system for a vehicle comprising:
a steering shaft having a longitudinal axis;
a jacket surrounding the shaft, the shaft rotatable with respect to the jacket; and
at least one mechanical energy storing element arranged to provide torque feedback when the steering shaft is rotated, the at least one mechanical energy storing element including a first mechanical energy storing element having a first end engageable with the jacket and a second end engageable with the shaft, and a second mechanical energy storing element having a first end engageable with the jacket and a second end engageable with the shaft, the first mechanical energy storing element provides resistance to rotation of the shaft in a first rotational direction, and the second mechanical energy storing element provides resistance to rotation of the shaft in a second rotational direction, the mechanical energy storing element including at least one spring having a first end engageable with the jacket surrounding the shaft and a second end attached to the shaft; and
a damper configured to damp oscillations of the at least one spring, the damper including one of a viscous damper and a friction damper, wherein the damper includes a rolling diaphragm containing a viscous fluid and movably supported between a fixed cylinder and a nut, the nut linearly translatable by rotation of the steering shaft.

19. A torque feedback system for a vehicle comprising:
a steering shaft having a longitudinal axis;
a jacket surrounding the shaft, the shaft rotatable with respect to the jacket; and
at least one mechanical energy storing element arranged to provide torque feedback when the steering shaft is rotated, the at least one mechanical energy storing element including a first mechanical energy storing element having a first end engageable with the jacket and a second end engageable with the shaft, and a second mechanical energy storing element having a first end engageable with the jacket and a second end engageable with the shaft, the first mechanical energy storing element provides resistance to rotation of the shaft in a first rotational direction, and the second mechanical energy storing element provides resistance to rotation of the shaft in a second rotational direction, the mechanical energy storing element including at least one spring having a first end engageable with the jacket surrounding the shaft and a second end attached to the shaft; and a damper configured to damp oscillations of the at least one spring, the damper including one of a viscous damper and a friction damper, wherein the damper includes an eccentric cam surrounding the steering shaft, the eccentric cam engaging a spring biased towards the eccentric cam.

20. A torque feedback system for a vehicle comprising:

a steering shaft having a longitudinal axis;

a jacket surrounding the shaft, the shaft rotatable with respect to the jacket; and at least one mechanical energy storing element arranged to provide torque feedback when the steering shaft is rotated, the at least one mechanical energy storing element including a first mechanical energy storing element having a first end engageable with the jacket and a second end engageable with the shaft, and a second mechanical energy storing element having a first end engageable with the jacket and a second end engageable with the shaft, the first mechanical energy storing element provides resistance to rotation of the shaft in a first rotational direction, and the second mechanical energy storing element provides resistance to rotation of the shaft in a second rotational direction, the mechanical energy storing element including at least one spring having a first end engageable with the jacket surrounding the shaft and a second end attached to the shaft; and a damper configured to damp oscillations of the at least one spring, the damper including one of a viscous damper and a friction damper, wherein the damper includes at least one of a lip seal and a garter spring surrounding the steering shaft.

* * * * *